United States Patent
Larsen et al.

(10) Patent No.: US 9,857,179 B2
(45) Date of Patent: Jan. 2, 2018

(54) MAGNETIC ANOMALY TRACKING FOR AN INERTIAL NAVIGATION SYSTEM

(71) Applicants: Michael S. Larsen, Woodland Hills, CA (US); Michael D. Bulatowicz, Canoga Park, CA (US); A. Douglas Meyer, Woodland Hills, CA (US); Dennis P. Bevan, Thousand Oaks, CA (US)

(72) Inventors: Michael S. Larsen, Woodland Hills, CA (US); Michael D. Bulatowicz, Canoga Park, CA (US); A. Douglas Meyer, Woodland Hills, CA (US); Dennis P. Bevan, Thousand Oaks, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 223 days.

(21) Appl. No.: 14/586,207

(22) Filed: Dec. 30, 2014

(65) Prior Publication Data

US 2016/0187142 A1     Jun. 30, 2016

(51) Int. Cl.
*G01D 7/00* (2006.01)
*G01C 21/18* (2006.01)
(Continued)

(52) U.S. Cl.
CPC ............ *G01C 21/18* (2013.01); *G01C 21/08* (2013.01); *G01C 21/165* (2013.01); *G01C 21/20* (2013.01); *G01P 15/105* (2013.01); *G01P 15/14* (2013.01)

(58) Field of Classification Search
CPC ...... G01D 5/14; G01D 5/244; G01D 5/24438; G01D 5/24471; G01D 5/24485;
(Continued)

(56) References Cited

U.S. PATENT DOCUMENTS

| | | | |
|---|---|---|---|
| 4,509,131 A | | 4/1985 | Krasnjanski |
| 6,016,116 A | * | 1/2000 | Henderson ............. F41G 7/343 342/64 |

(Continued)

FOREIGN PATENT DOCUMENTS

| | | | | |
|---|---|---|---|---|
| EP | 2541199 A1 | * | 1/2013 | ............. G01C 21/08 |
| EP | 2541199 A1 | | 1/2013 | |

(Continued)

OTHER PUBLICATIONS

Machine Translation of EP2541199A1, sent with EESR from EPO.
(Continued)

*Primary Examiner* — Patrick Assouad
*Assistant Examiner* — Taqi Nasir
(74) *Attorney, Agent, or Firm* — Tarolli, Sundheim, Covell & Tummino LLP

(57) ABSTRACT

One example includes an inertial navigation system (INS). The INS includes a navigation controller configured to generate inertial data associated with motion of a vehicle based on at least one navigation sensor configured on the vehicle and based on magnetic anomaly data. The INS also includes a magnetic anomaly INS-aiding system comprising a plurality of magnetometers distributed in a respective plurality of locations on the vehicle. The magnetic anomaly INS-aiding system can be configured to generate the magnetic anomaly data based on magnetic field measurements of a fixed magnetic anomaly at each of the plurality of magnetometers.

14 Claims, 3 Drawing Sheets

(51) Int. Cl.
*G01P 15/105* (2006.01)
*G01P 15/14* (2013.01)
*G01C 21/20* (2006.01)
*G01C 21/08* (2006.01)
*G01C 21/16* (2006.01)

(58) Field of Classification Search
CPC ............ G01D 5/24495; G01D 5/2452; G01D 5/2454; G01D 5/246; G01D 5/249; G01D 5/2497; G01D 5/345; G01D 5/34715; G01D 7/00
USPC ............... 324/345, 313, 331, 377, 381, 463, 324/201–206, 207.11–207.19, 324/207.2–207.26, 210, 213, 219, 232, 324/246, 247, 260, 262, 263
See application file for complete search history.

(56) References Cited

U.S. PATENT DOCUMENTS

| | | |
|---|---|---|
| 7,400,142 B2 | 7/2008 | Greelish |
| 7,526,384 B2 | 4/2009 | MacIntosh et al. |
| 8,423,276 B2 | 4/2013 | Judd |
| 8,461,999 B2 | 6/2013 | Dishongh et al. |
| 2005/0099177 A1* | 5/2005 | Greelish .............. G01R 33/025 324/252 |
| 2008/0262772 A1 | 10/2008 | Luinge et al. |
| 2010/0308811 A1* | 12/2010 | Wallauer ............ G01R 33/0029 324/225 |
| 2011/0238307 A1 | 9/2011 | Psiaki et al. |
| 2013/0018582 A1 | 1/2013 | Miller et al. |
| 2013/0253821 A1* | 9/2013 | Joseph .................. G01C 17/38 701/501 |
| 2014/0025286 A1* | 1/2014 | Donovan ............... G01C 21/20 701/408 |

FOREIGN PATENT DOCUMENTS

| | | |
|---|---|---|
| JP | 2006521601 | 9/2006 |
| WO | 2004077374 A1 | 9/2004 |
| WO | WO 2013/150183 A1 | 10/2013 |

OTHER PUBLICATIONS

European Search Report dated May 4, 2016 for corresponding EP 15187614.1-1557.
Japanese Office Action for corresponding JP 2015-212867 dated Oct. 4, 2016.

* cited by examiner

MAGNETIC ANOMALY TRACKING FOR AN INERTIAL NAVIGATION SYSTEM

TECHNICAL FIELD

This disclosure relates generally to sensor systems, and more specifically to magnetic anomaly tracking for an inertial navigation system.

BACKGROUND

Navigation and inertial data can correspond to information regarding motion of a vehicle, such as including velocity, position, and/or orientation information associated with the vehicle. Such navigation and inertial data can be implemented for tracking motion of the vehicle over time and for calculating position and timing information of the vehicle, such as over time. Navigation and inertial data can be obtained via a variety of different types of sensors, such as gyroscopes and/or accelerometers. As another example, for an aircraft vehicle, airspeed can be measured to provide a measure of vehicle velocity relative to the air around it. However, an airspeed measurement is first order dependent on both wind speed relative to the ground and air current fluctuations around the vehicle. Watercraft can experience similar uncertainties in measurement of velocity of the associated vehicle. Therefore, some vehicles may require additional or alternative systems for measuring inertial data and/or calculating a navigation solution.

As an example, navigation and inertial data measurement can often be aided via other types of sensor systems, such as Global Navigation Satellite System (GNSS) measurements and vision aiding (e.g., based on a ground-facing camera for earth-fixed feature tracking or optical flow velocity aiding, or a star tracking system for orientation and position-aiding relative to the inertially fixed stars). However, in the modern era of electronic warfare, GNSS measurements cannot be considered reliable even in clear-sky conditions, and certain environments, such as urban canyons, dense growth canopies, indoor, underground, and underwater environments, cannot rely on the availability of GNSS signals under the best of circumstances. Additionally, because vision aiding typically requires the vehicle to be traveling through or over a region with distinct and stationary visual features or with a clear view of the stars, vision aiding can often be limiting as a manner of assisting with calculation of inertial data to determine a navigation solution. For example, such vision aiding can implement a star tracker system or a system that identifies other visual features (e.g., mountains or rivers, etc.). However, these techniques can often be limited by visibility conditions or by a lack of useful proximity to the vehicle itself, and can thus limit effective error growth reduction in inertial data or a navigation solution.

SUMMARY

One example includes an inertial navigation system (INS). The INS includes a navigation controller configured to generate inertial data associated with motion of a vehicle based on at least one navigation sensor configured on the vehicle and based on magnetic anomaly data. The INS also includes a magnetic anomaly INS-aiding system comprising a plurality of magnetometers distributed in a respective plurality of locations on the vehicle. The magnetic anomaly INS-aiding system can be configured to generate the magnetic anomaly data based on magnetic field measurements of a fixed magnetic anomaly at each of the plurality of magnetometers.

Another example includes a method for providing magnetic anomaly detection assistance in an INS of a vehicle. The method includes obtaining magnetic field measurements associated with a fixed magnetic anomaly relative to an Earth coordinate frame (e.g. ECEF: Earth-Centered, Earth-Fixed; ECR: Earth Centered Rotational; IRP: International Reference Pole; IRM: International Reference Meridian; or any other relevant reference frame to which the magnetic anomaly has a known relationship), or a similar reference frame (e.g., for non-terrestrial applications, such as on other planets or moons), via a plurality of magnetometers arranged in an array about the vehicle. The method also includes providing magnetic anomaly data associated with the magnetic field measurements relative to predetermined distances between a plurality of locations associated with the respective plurality of magnetometers about the vehicle. The method further includes calculating a velocity of the vehicle relative to an Earth coordinate frame based on the magnetic anomaly data via the INS.

Another example includes an INS. The INS includes a navigation controller configured to generate inertial data associated with a velocity of a vehicle relative to an Earth coordinate frame based on at least one navigation sensor configured on the vehicle and based on magnetic anomaly data. The INS also includes a magnetic anomaly INS-aiding system comprising a plurality of magnetometers distributed in an array at a respective plurality of locations on the vehicle having respective predetermined distances with respect to each other. The magnetic anomaly INS-aiding system can be configured to generate the magnetic anomaly data based on magnetic field measurements of a fixed magnetic anomaly at each of the plurality of magnetometers with respect to the predetermined distances.

DETAILED DESCRIPTION

This disclosure relates generally to sensor systems, and more specifically to magnetic anomaly tracking for an inertial navigation system (INS). An INS can include a navigation controller that is configured to generate inertial data associated with motion of a vehicle based on at least one navigation sensor configured on the vehicle and based on magnetic anomaly data. As an example, the magnetic anomaly data can be associated with a magnetic anomaly emanating from a fixed position in an Earth coordinate frame. The magnetic anomaly data can be generated by a magnetic anomaly INS-aiding system that includes a plurality of magnetometers that are each configured to measure the fixed magnetic anomaly. As an example, the magnetometers can be located as an array about the vehicle at predetermined distances with respect to each other. Therefore, the magnetic anomaly data can be implemented to calculate a velocity of the vehicle based on the magnetic field measurements of the fixed magnetic anomaly at the predetermined distances with respect to each other. Accordingly, the magnetic anomaly data can be implemented to substantially suppress the growth of velocity and/or orientation errors associated with the vehicle in the inertial data generated by the navigation sensor.

As an example, the magnetic anomaly INS-aiding system can include a magnetometer controller that is configured to receive the magnetic field measurements from each of the respective plurality of magnetometers and to generate the magnetic anomaly data as a composite magnetic field measurement associated with a location of the fixed magnetic anomaly based on a comparison of the magnetic field measurements of the array of magnetometers. For example, the magnetometers can be arranged as a one-dimensional array (e.g., a first magnetometer in a fore-section and a second magnetometer in an aft-section) along a substantially central axis of the vehicle corresponding to a direction of forward vehicle motion. The magnetometer controller can be configured, for example, to implement a correlation algorithm based on the magnetic field measurements. The correlation algorithm can be configured to provide feature matching on each of the magnetic field measurements to substantially suppress noise associated with the magnetic field measurements and to provide error correction with respect to detection of the fixed magnetic anomaly. Additionally, the magnetometer controller can be configured to calculate a velocity of the vehicle relative to an Earth coordinate frame based on the magnetic field measurements in real-time and a confidence score that is generated based on the correlation algorithm. Accordingly, the INS can generate the inertial data and calculate a position solution for the vehicle in a more accurate manner than could be achieved with inertial sensor data alone without the use of a Global Navigation Satellite System (GNSS) receiver.

Figure 1:
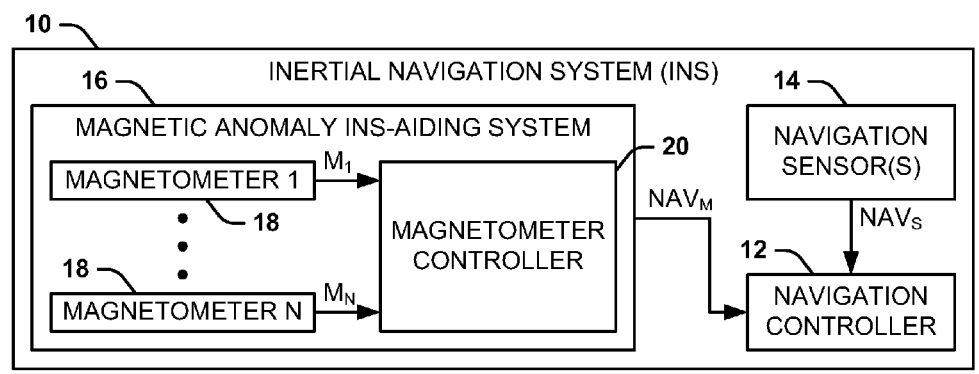
FIG. 1 illustrates an example of an inertial navigation system (INS).

FIG. 1 illustrates an example of an inertial navigation system (INS) 10. The INS 10 can be implemented in the control electronics of a vehicle. The vehicle can be any of a variety of vehicles, such as a land vehicle, watercraft, aircraft, or spacecraft, and which can be manned or unmanned. As another example, the vehicle can be a small vehicle, such as a small automated vehicle (e.g., an interplanetary rover) or even a person. The INS 10 can be configured to control and/or record motion of the vehicle, such as by calculating at least one of velocity, position, and orientation of the vehicle in real-time.

The INS 10 includes a navigation controller 12 that is configured to calculate inertial data associated with the motion of the vehicle based on measurements provided by at least one navigation sensor 14. In the example of FIG. 1, the measurements provided by the navigation sensor(s) 14 are demonstrated by a signal $NAV_S$. For example, the navigation sensor(s) 14 can include a sensor configured to measure velocity (e.g., by measuring airspeed), at least one gyroscope, at least one accelerometer, and/or a variety of other measurement devices. Therefore, the measurements $NAV_S$ provided by the navigation sensor(s) 14 can include velocity, rotation rate or rotation angle about at least one sensitive axis, and/or acceleration in at least one coordinate frame axis.

The INS 10 also includes a magnetic anomaly INS-aiding system 16 that is configured to generate magnetic anomaly data, demonstrated in the example of FIG. 1 as a signal $NAV_M$ that is provided to the navigation controller 12. The magnetic anomaly INS-aiding system 16 includes a plurality N of magnetometers 18, where N is a positive integer. The magnetometers 18 can be configured as any of a variety of types of magnetometers to measure scalar and/or vector magnetic field measurements, such as based on the magnetometers 18 being configured as nuclear magnetic resonance (NMR) magnetometers, electron paramagnetic resonance (EPR) magnetometers, flux-gate magnetometers, or any of a variety of other types or combinations of magnetometer systems. As an example, the magnetometers 18 can be arranged in an array about the vehicle at respective locations that are spaced apart from each other by predetermined distances. In the example of FIG. 1, the magnetometers 18 are configured to measure external magnetic fields in real-time, demonstrated by magnetic field measurements $M_1$ through $M_N$, respectively. The magnetic field measurements $M_1$ through $M_N$ are provided to a magnetometer controller 20 that is configured to calculate the magnetic anomaly data $NAV_M$ based on the magnetic field measurements $M_1$ through $M_N$ relative to the respective locations of the magnetometers on the vehicle.

For example, the magnetometers 18 can each measure a magnetic anomaly that is associated with a fixed location on the Earth coordinate space or fixed relative to another reference frame, referred to hereinafter as "fixed magnetic anomaly". Because fixed magnetic anomalies are generally omnipresent in any operational environment in which the vehicle can travel, the magnetic anomaly INS-aiding system 16 can provide sufficient INS-aiding capability in almost every environment. As an example, the magnetometers 18 can include at least a first magnetometer and a second magnetometer that are located, respectively, at a fore-section of the vehicle and an aft-section of the vehicle at locations having a predetermined distance with respect to each other along a substantially central axis of the vehicle corresponding to a direction of forward vehicle motion (e.g., a vehicle coordinate-frame roll-axis). Therefore, the magnetometer controller 20 can calculate velocity in the Earth coordinate frame, or any other relevant reference frame, based on a time-delay of the measurement of the fixed magnetic anomaly between the first and second of the magnetometers 18 as the vehicle travels forward. As another example, the magnetometers 18 can be configured in an at least two-dimensional array, such as including wing-tips on an aircraft along an axis that is orthogonal with a direction of forward vehicle motion.

Therefore, based on the relative location of the magnetometers 18 on the vehicle, the magnetometer controller 20 can calculate the magnetic anomaly data $NAV_M$ as a function of the motion of the vehicle relative to the fixed magnetic anomaly, as measured by each of the magnetometers 18. As a result, the magnetic anomaly data $NAV_M$ is provided to the navigation controller 12, such that the navigation controller can be configured to calculate the inertial data (e.g. the position attitude, heading, and/or velocity solution of the vehicle) based on the measurements $NAV_S$ provided by the navigation sensor(s) 14 and the magnetic anomaly data $NAV_M$. As an example, the navigation controller 12 can be configured to implement a navigation algorithm that is configured to correlate the measurements $NAV_S$ provided by the navigation sensor(s) 14 and the magnetic anomaly data $NAV_M$ to provide a more accurate navigation solution. For example, the navigation algorithm can be implemented via a Kalman filter, an optimum state estimator, or any of a variety of statistical algorithms for calculating the inertial data based on the measurements $NAV_S$ and the magnetic anomaly data $NAV_M$.

As an example, the inertial data can be calculated initially by the navigation controller 12 based on the measurements NAV$_S$ provided by the navigation sensor(s) 14. The navigation controller 12 can then implement the magnetic anomaly data NAV$_M$ to calculate inertial data separately with respect to the measurements NAV$_S$ provided by the navigation sensor(s) 14. Therefore, the navigation controller 12 can compare the inertial data measurements, such as to substantially mitigate errors in the measurements NAV$_S$ provided by the navigation sensor(s) 14. For example, in response to the magnetic anomaly data NAV$_M$, the navigation controller 12 can suppress growth of velocity and/or orientation errors in the inertial data calculated based on the measurements NAV$_S$ provided by the navigation sensor(s) 14. As another example, in response to the magnetic anomaly data NAV$_M$, the navigation controller 12 can calculate the inertial data based on a combination of the measurements NAV$_S$ and the magnetic anomaly data NAV$_M$, such as based on any of a variety of statistical algorithms.

In addition, the magnetometer controller 20 can be configured to implement a correlation algorithm in calculating the anomaly data NAV$_M$. For example, the magnetometer controller 20 can be configured to implement the correlation algorithm and real-time measurements of the magnetometers 18 to provide feature matching of the magnetic field measurements M$_1$ through M$_N$, such as to determine errors in the magnetic field measurements M$_1$ through M$_N$ with respect to each other (e.g., to determine if all of the magnetometers 18 have measured the same fixed magnetic anomaly). The correlation algorithm can be implemented to generate a confidence score associated with the real-time measurements of the magnetometers 18, such that the confidence score and the real-time measurements of the magnetometers 18 can be implemented to calculate the magnetic anomaly data NAV$_M$ in a more accurate manner. Accordingly, the magnetic anomaly data NAV$_M$ can provide INS-aiding in an accurate manner absent a GNSS receiver.

Furthermore, the magnetic anomaly INS-aiding system 16 can be configured to provide error correction with respect to the sensor(s) 14 of the INS 10. As an example, the magnetometers 18 can be configured to measure both a magnitude and direction of the fixed magnetic anomaly. Therefore, the magnetic field measurements M$_1$ through M$_N$ are provided to the magnetometer controller 20 as including vector and scalar information regarding the fixed magnetic anomaly. As a result, the magnetometer controller 20 can provide the magnetic anomaly data NAV$_M$ in a manner to allow the navigation controller 12 to suppress measurement drift associated with one or more gyroscopes and accelerometers in the associated sensor(s) 14 based on a correlation of the scalar and vector magnetic field measurements M$_1$ through M$_N$ with respect to each other. As a result, the magnetometer controller 20 can be configured to reduce a rate of growth of errors in determining a navigation solution, such as to increase accuracy of a navigation solution over a longer period of time. Accordingly, the navigation controller 12 can provide orientation information about all three vehicle coordinate frame axes relative to a given coordinate frame, such as Earth coordinate frame.

Therefore, as described herein, the INS 10 can incorporate the magnetic anomaly data NAV$_M$ to provide an improved navigation aiding solution over typical navigation aiding solutions. For example, based on a limited availability of GNSS signals in certain environments, such as can occur in urban canyons, dense growth canopies, indoor, underground, and underwater environments, typical navigation aiding solutions that incorporate a GNSS receiver can be subject to errors. However, because magnetic anomalies are almost universally available in any environment in which a vehicle can travel, the INS 10 can provide navigation aiding based on measurement of the magnetic anomalies based on the plurality of magnetometers 18, and more specifically based on the respective locations of the magnetometers 18 with respect to the measurements M$_1$ through M$_N$. Implementing multiple magnetometers 18 provides a more reliable navigation aiding solution than other navigation aiding solutions that only incorporate a single magnetometer. For example, typical navigation aiding solutions that incorporate a single magnetometer attempt to correlate the observed anomaly to an anomaly which has previously been mapped in the local area in which the vehicle travels, such that without the a priori knowledge of the local magnetic anomalies in the area of interest (e.g., based on a predetermined magnetic anomaly map), navigation aiding cannot occur. Accordingly, the INS 10 can provide navigation aiding without a priori knowledge of magnetic anomalies and without a GNSS receiver. In addition, the INS 10 can also be configured to calculate a position of the vehicle in the Earth coordinate frame if the position of a magnetic anomaly or magnetic anomalies is identified in the Earth coordinate frame.

Figure 2:
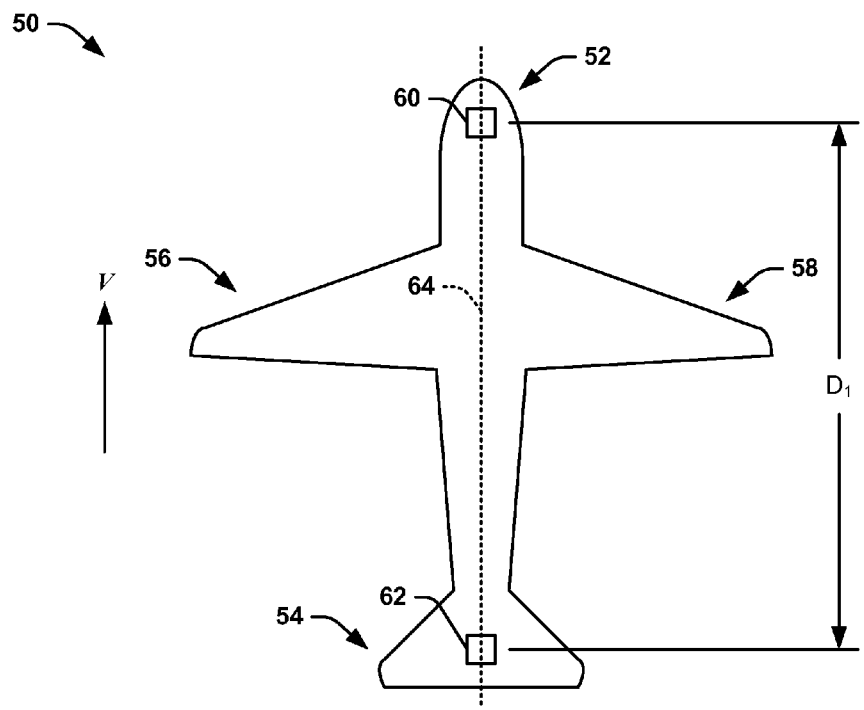
FIG. 2 illustrates an example of a vehicle.

FIG. 2 illustrates an example of a vehicle 50. In the example of FIG. 2, the vehicle 50 is demonstrated as an aircraft having a fore-section 52 and an aft-section 54, as well as a port wing 56 and a starboard wing 58. The vehicle 50 is demonstrated as including a first magnetometer 60 mounted in the fore-section 52 of the vehicle 50 and a second magnetometer 62 mounted in the aft-section 54 of the vehicle 50. The first and second magnetometers 60 and 62 are separated by a distance D$_1$ that can correspond to a distance that is predetermined, such as during manufacture of the vehicle 50. As an example, the first magnetometer 60 and the second magnetometer 62 can be mounted in the respective fore-section 52 and aft-section 54 along a substantially central axis 64 of the vehicle 50, such as corresponding to a roll-axis of the vehicle 50. As an example, the first and second magnetometers 60 and 62 can correspond to two of the magnetometers 18 in the magnetic anomaly INS-aiding system 16 in the example of FIG. 1, such that the vehicle 50 can include the INS 10 (not shown in the example of FIG. 2).

The first and second magnetometers 60 and 62 are therefore arranged in an array to measure the fixed magnetic anomaly as the vehicle 50 travels along a velocity vector, demonstrated in the example of FIG. 2 as a vector V. For example, the first and second magnetometers 60 and 62 are fixed in a spatial orientation and position with respect to the coordinate frame of the vehicle 50 to track the fixed magnetic anomaly, such as one of many naturally occurring magnetic field anomalies, as the vehicle 50 passes by them as it travels along the velocity vector V. As an example, based on the relative location of the first and second magnetometers 60 and 62 on the vehicle 50, the magnetometer controller (e.g., the magnetometer controller 20) can calculate the magnetic anomaly data NAV$_M$ as a function of the motion of the vehicle 50 relative to the fixed magnetic anomaly, as measured by each of the first and second magnetometers 60 and 62. As a result, the magnetic anomaly data NAV$_M$ is provided to the associated navigation controller (e.g., the navigation controller 12), such that the navigation controller can be configured to calculate the inertial data based on the measurements NAV$_S$ provided by associated navigation sensors (e.g., the navigation sensor(s) 14) and the magnetic anomaly data NAV$_M$. For example, the magnetic anomaly data NAV$_M$ can be implemented to suppress velocity and/or orientation errors associated with the navigation sensors (e.g., as provided by the measurements $NAV_S$).

Figure 3:
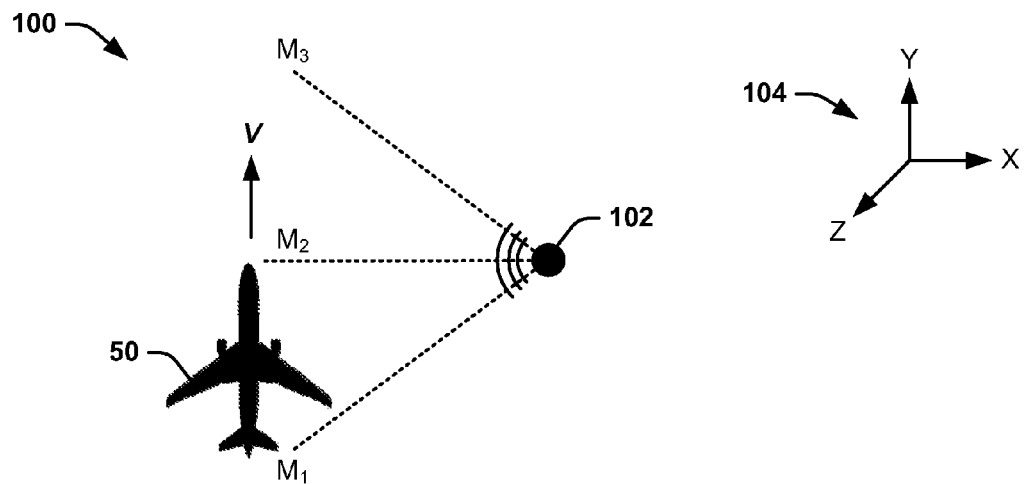
FIG. 3 illustrates an example of a diagram of obtaining magnetic anomaly data.

FIG. 3 illustrates an example of a diagram 100 of obtaining magnetic anomaly data. The diagram 100 demonstrates the vehicle 50 traveling along a velocity vector V. As described in the example of FIG. 2, the vehicle 50 includes the first magnetometer 60 in the fore-section of the vehicle 50 and the second magnetometer 62 in the aft-section of the vehicle 50, with the first and second magnetometers 60 and 62 being positioned along the substantially central axis 64 (e.g., the coordinate frame roll axis of the vehicle 50). The diagram 100 also includes a fixed magnetic anomaly 102 that is geographically separate from the vehicle 50. As an example, the fixed magnetic anomaly 102 can correspond to a naturally occurring magnetic anomaly fixed in the Earth coordinate frame. Thus, the vehicle 50 travels past the fixed magnetic anomaly 102 along the velocity vector V in the Y-direction, as provided by the Cartesian coordinate system 104.

At the position of the vehicle 50 demonstrated in the example of FIG. 3, the first magnetometer 60 measures a magnetic field $M_2$ associated with the fixed magnetic anomaly and the second magnetomer 62 measures a magnetic field $M_1$ associated with the fixed magnetic anomaly. As an example, the position of the vehicle 50 demonstrated in the example of FIG. 3 can correspond to a time $T_0$, such that the first magnetometer 60 can measure the magnetic field $M_2$ associated with the fixed magnetic anomaly 102 at the time $T_0$. At a time $T_1$ subsequent to the time $T_0$ by an elapsed time $T_A$, the second magnetometer 62 can measure the magnetic field $M_2$, such that the time $T_1$ can correspond to a time $T_0+T_A$. For example, the magnetic field $M_2$ can be measured by the second magnetometer 62 at an amplitude that is approximately equal to the amplitude of the magnetic field $M_2$ at the time $T_0$, as measured by the first magnetometer 60. Because the distance $D_1$ between the first and second magnetometers 60 and 62 is a known fixed value, then the magnetometer controller (e.g., the magnetometer controller 20) can calculate the velocity of the vehicle 50 along the substantially central axis 64 between the first and second magnetometers 60 and 62. As an example, the velocity $V_1$ of the vehicle 50 can be calculated based on the fixed distance $D_1$ between first and second magnetometers 60 and 62 divided by the time between observations of the magnetic field $M_2$ by each of the first and second magnetometers 60 and 62, as provided in Equation 1:

$$V_1=D_1/T_A \qquad \text{Equation 1}$$

Thus, the velocity $V_1$ can be implemented by the associated navigation controller (e.g., the navigation controller 12) to augment measurement of the velocity of the vehicle 50 that is provided via navigation sensors and/or to substantially mitigate errors in the calculation of the velocity of the vehicle 50 by the navigation sensors.

As an example, an associated magnetic anomaly INS-aiding system (e.g., the magnetic anomaly INS-aiding system 16) of the vehicle 50 can continuously calculate the velocity $V_1$ in real-time. For example, at a time prior to the time $T_0$, the magnetic anomaly INS-aiding system of the vehicle 50 can measure the velocity $V_1$ based on respective measurements of the magnetic field $M_1$ by the first and second magnetometers 60 and 62 as the vehicle 50 travels along the velocity vector V. Similarly, at a time subsequent to the time $T_1$, the magnetic anomaly INS-aiding system of the vehicle 50 can measure the velocity $V_1$ based on respective measurements of a magnetic field $M_3$ by the first and second magnetometers 60 and 62 as the vehicle 50 travels along the velocity vector V. For example, the associated magnetometer controller can implement a correlation algorithm and real-time measurements of the first and second magnetometers 60 and 62 to provide feature matching of the magnetic fields $M_1$, $M_2$, and $M_3$, such as to determine errors in the magnetic field measurements $M_1$, $M_2$, and $M_3$ with respect to each other, such as to determine if the magnetometers 60 and 62 have measured the fixed magnetic anomaly 102. The correlation algorithm can be implemented to generate a confidence score associated with the real-time measurements of the first and second magnetometers 60 and 62, such that the confidence score and the real-time measurements of the first and second magnetometers 60 and 62 can be implemented to calculate the magnetic anomaly data in a more accurate manner.

Figure 4:
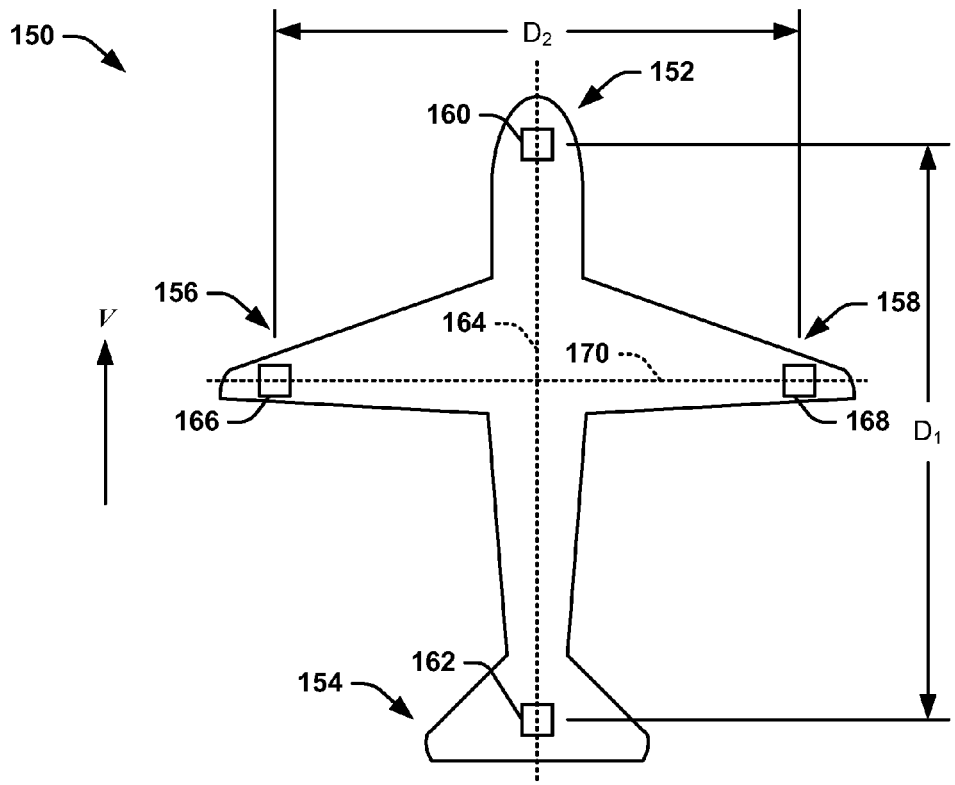
FIG. 4 illustrates another example of a vehicle.

FIG. 4 illustrates another example of a vehicle 150. In the example of FIG. 4, the vehicle 150 is demonstrated as an aircraft having a fore-section 152 and an aft-section 154, as well as a port wing 156 and a starboard wing 158. The vehicle 150 is demonstrated as including a first magnetometer 160 mounted in the fore-section 152 of the vehicle 150 and a second magnetometer 162 mounted in the aft-section 154 of the vehicle 150. The first and second magnetometers 160 and 162 are separated by a distance $D_1$ that can correspond to a distance that is predetermined, such as during manufacture of the vehicle 150. As an example, the first magnetometer 160 and the second magnetometer 162 can be mounted in the respective fore-section 152 and aft-section 154 along a substantially central axis 164 of the vehicle 150, such as corresponding to a roll-axis of the vehicle 150.

Similarly, the vehicle 150 is demonstrated as including a third magnetometer 166 mounted in the port wing 156 of the vehicle 150 and a fourth magnetometer 168 mounted in the starboard wing 158 of the vehicle 150. The third and fourth magnetometers 166 and 168 are separated by a distance $D_2$ that can correspond to a distance that is predetermined, such as during manufacture of the vehicle 150 and optimized for best INS-aiding performance based on anticipated and/or measured vehicle dynamics. As an example, the third magnetometer 166 and the fourth magnetometer 168 can be mounted in the respective port and starboard wings 156 and 158 along an axis 170 of the vehicle 150 that is approximately orthogonal with respect to the substantially central axis 164. As an example, the first, second, third, and fourth magnetometers 160, 162, 166, and 168 can correspond to four of the magnetometers 18 in the magnetic anomaly INS-aiding system 16 in the example of FIG. 1, such that the vehicle 150 can include the INS 10 (not shown in the example of FIG. 4).

The first, second, third, and fourth magnetometers 160, 162, 166, and 168 are therefore arranged in an array to measure the fixed magnetic anomaly as the vehicle 150 travels along a velocity vector, demonstrated in the example of FIG. 4 as a vector V. As an example, the first and second magnetometers 160 and 162 and the third and fourth magnetometers 166 and 168 can all be arranged coplanar, or can be out-of-plane with respect to the pairs of first and second magnetometers 160 and 162 and the third and fourth magnetometers 166 and 168. For example, the first, second, third, and fourth magnetometers 160, 162, 166, and 168 are fixed in a spatial orientation and position with respect to the coordinate frame of the vehicle 150 to track the fixed magnetic anomaly, such as one of many naturally occurring magnetic field anomalies, as the vehicle 150 passes by them as it travels along the velocity vector V.

As an example, based on the relative location of the first, second, third, and fourth magnetometers 160, 162, 166, and 168 on the vehicle 150, the magnetometer controller (e.g., the magnetometer controller 20) can calculate the magnetic anomaly data $NAV_M$ as a function of the motion of the vehicle 150 relative to the fixed magnetic anomaly, as measured by each of the first, second, third, and fourth magnetometers 160, 162, 166, and 168. As a result, the magnetic anomaly data $NAV_M$ is provided to the associated navigation controller (e.g., the navigation controller 12), such that the navigation controller can be configured to calculate the inertial data based on the measurements $NAV_S$ provided by associated navigation sensors (e.g., the navigation sensor(s) 14) and the magnetic anomaly data $NAV_M$.

As another example, based on the increased number of magnetometers of the vehicle 150 relative to the vehicle 50 in the example of FIG. 2, measurement noise and error sources of the magnetic fields associated with the fixed magnetic anomaly can be substantially suppressed based on the respective individual magnetic field measurements of the first, second, third, and fourth magnetometers 160, 162, 166, and 168. For example, the associated magnetic anomaly INS-aiding system can implement improved feature matching of the first, second, third, and fourth magnetometers 160, 162, 166, and 168 relative to the first and second magnetometers 60 and 62 of the vehicle 50 in the example of FIG. 2. In addition, as an example, the vehicle 150 can have a direction of travel relative to a reference frame that is useful for navigation that may not be oriented directly along the roll axis (e.g., during turns and altitude changes), such that the array of the first, second, third, and fourth magnetometers 160, 162, 166, and 168 can aid in the suppression of systematic errors. Therefore, the third and fourth magnetometers 166 and 168 can enhance the available navigation information, such as velocity, acceleration, and orientation information.

In the example of FIG. 4, the first, second, third, and fourth magnetometers 160, 162, 166, and 168 are demonstrated in a two-dimensional array. Therefore, the velocity components of the vehicle 150 can be calculated with respect to multiple planes of the vehicle coordinate plane, such as the roll-pitch plane of the vehicle 150. In addition, the vehicle 150 could incorporate additional magnetometers, such as out-of-plane with respect to at least one of the pairs of the first and second magnetometers 160 and 162 and the third and fourth magnetometers 166 and 168. Therefore, the first, second, third, and fourth magnetometers 160, 162, 166, and 168 and the additional magnetometers can be arranged in a three-dimensional array. Thus, three orthogonal components of the velocity of the vehicle 150 can be calculated, and the three-dimensional array of magnetometers can also be configured to provide orientation error correction (e.g., with respect to gyroscopes along each of three orthogonal axes). Furthermore, the three-dimensional array of the magnetometers can be particularly useful for other types of vehicles with components of velocity in all three directions that can be of similar magnitude, such as a submarine/UUV, helicopter/vertical take-off and landing (VTOL) vehicles, a person, or any other vehicle capable of similar velocities in at least two directions.

Figure 5:
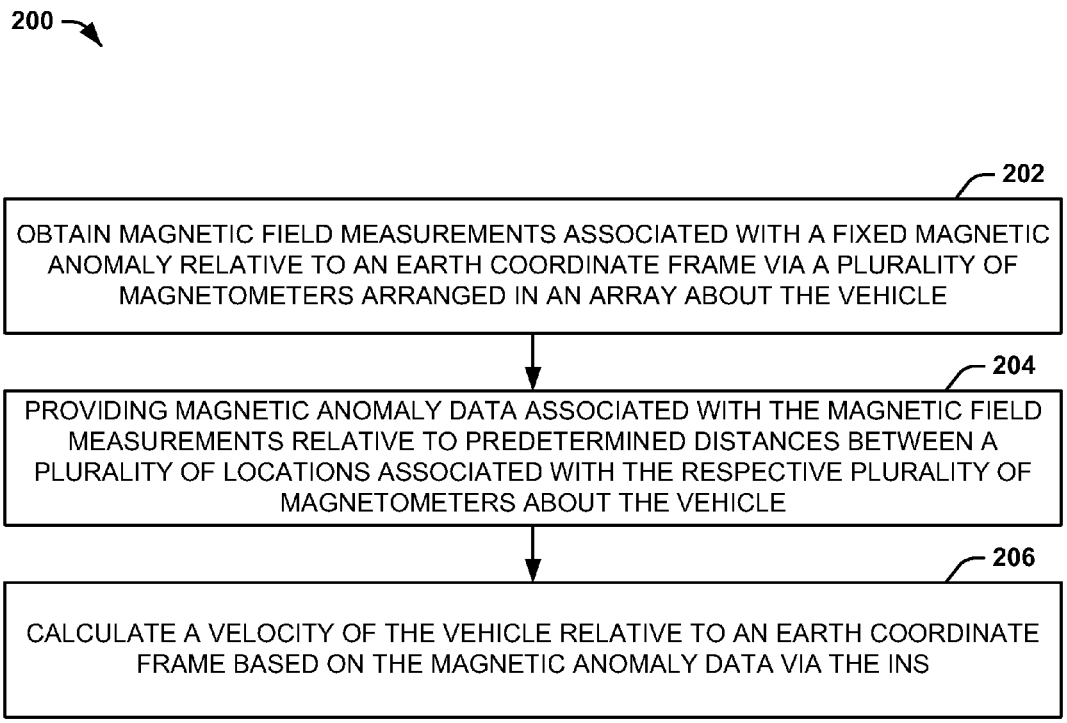
FIG. 5 illustrates an example of a method for providing magnetic anomaly detection assistance in an inertial navigation system.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for providing magnetic anomaly detection assistance in an inertial navigation system (e.g., the INS 10). At 202, magnetic field measurements associated with a fixed magnetic anomaly (e.g., the fixed magnetic anomaly 102) relative to an Earth coordinate frame are obtained via a plurality of magnetometers (e.g., the magnetometers 18) arranged in an array about the vehicle (e.g., the vehicle 50). At 204, magnetic anomaly data (e.g., the magnetic anomaly data $NAV_M$) associated with the magnetic field measurements relative to predetermined distances (e.g., the distance $D_1$) between a plurality of locations associated with the respective plurality of magnetometers about the vehicle is provided. At 206, a velocity of the vehicle relative to an Earth coordinate frame is calculated based on the magnetic anomaly data via the INS.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An inertial navigation system (INS) comprising:
   a navigation controller configured to generate inertial data associated with motion of a vehicle based on at least one navigation sensor configured on the vehicle and based on magnetic anomaly data;
   a magnetic anomaly INS-aiding system comprising a plurality of magnetometers distributed in a respective plurality of locations on the vehicle, the magnetic anomaly INS-aiding system being configured to generate the magnetic anomaly data based on magnetic field measurements of a fixed magnetic anomaly at each of the plurality of magnetometers; and
   a magnetometer controller to implement a correlation algorithm based on the magnetic field measurements, the correlation algorithm being configured to provide feature matching on each of the magnetic field measurements to substantially suppress noise associated with the magnetic field measurements and provide error correction with respect to detection of the fixed magnetic anomaly, wherein the magnetometer controller is further configured to generate a confidence score associated with the detection of the fixed magnetic anomaly based on the correlation algorithm, and wherein the magnetometer controller implements the confidence score and the magnetic field measurements in real-time to calculate a velocity of the vehicle relative to an Earth coordinate frame.

2. The system of claim 1, wherein the plurality of magnetometers are located at the plurality of locations at predetermined distances with respect to each other, such that the magnetic anomaly INS-aiding system is configured to generate the magnetic anomaly data based on magnetic field measurements at each of the plurality of magnetometers with respect to the predetermined distances.

3. The system of claim 1, wherein the plurality of magnetometers comprises a first magnetometer located at a fore-section of the vehicle and a second magnetometer located at an aft-section of the vehicle, the first and second magnetometers being located a predetermined distance with respect to each other along a substantially central axis of the vehicle corresponding to a direction of forward vehicle motion.

4. The system of claim 3, wherein the plurality of magnetometers further comprises a third magnetometer located on a port side of the vehicle and a fourth magnetometer located on a starboard side of the vehicle, the third and fourth magnetometers being located a predetermined distance with respect to each other along an axis of the vehicle that is approximately orthogonal with respect to the substantially central axis.

5. The system of claim 1, wherein the magnetic anomaly data is implemented by the navigation controller to calculate a velocity of the vehicle relative to an Earth coordinate frame based on the magnetic field measurements at each of the plurality of magnetometers.

6. The system of claim 1, wherein the magnetometer controller is further configured to receive the magnetic field measurements from each of the respective plurality of magnetometers and to generate the magnetic anomaly data as a composite magnetic field measurement associated with a location of the fixed magnetic anomaly based on a comparison of the magnetic field measurements.

7. The system of claim 1, wherein the plurality of magnetometers are distributed in an at least two-dimensional array along the vehicle, wherein the magnetic anomaly INS-aiding system is configured to calculate at least one of velocity, acceleration, orientation, and position in at least two coordinate frame axes based on the at least two-dimensional array of magnetometers.

8. The system of claim 1, wherein the at least one navigation sensor configured on the vehicle comprises at least one of a gyroscope and an accelerometer, wherein the navigation controller is configured to substantially mitigate errors associated with the at least one of the gyroscope and the accelerometer based on the magnetic anomaly data.

9. A method for providing magnetic anomaly detection assistance in an inertial navigation system (INS) of a vehicle, the method comprising:
obtaining magnetic field measurements associated with a fixed magnetic anomaly relative to an Earth coordinate frame via a plurality of magnetometers arranged in an array about the vehicle;
providing magnetic anomaly data associated with the magnetic field measurements relative to predetermined distances between a plurality of locations associated with the respective plurality of magnetometers about the vehicle;
implementing a correlation algorithm based on the magnetic field measurements;
comparing the magnetic field measurements based on the correlation algorithm to provide feature matching on each of the magnetic field measurements to substantially suppress noise associated with the magnetic field measurements and provide error correction with respect to detection of the fixed magnetic anomaly;
generating a confidence score associated with the detection of the fixed magnetic anomaly based on the correlation algorithm; and
calculating a velocity of the vehicle relative to an Earth coordinate frame via the INS based on the confidence score and the magnetic field measurements in real-time.

10. The method of claim 9, further comprising generating inertial data associated with motion of a vehicle based on at least one navigation sensor configured on the vehicle and based on the magnetic anomaly data, the inertial data comprising the at least one of the velocity and the position of the vehicle.

11. The method of claim 9, further comprising:
generating inertial data associated with the vehicle based on at least one of a gyroscope and an accelerometer; and
implementing error correction of the inertial data associated with the at least one of the gyroscope and the accelerometer based on the magnetic anomaly data.

12. An inertial navigation system (INS) comprising:
a navigation controller configured to generate inertial data associated with a velocity of a vehicle relative to an Earth coordinate frame based on at least one navigation sensor configured on the vehicle and based on magnetic anomaly data;
a magnetic anomaly INS-aiding system comprising a plurality of magnetometers distributed in an array at a respective plurality of locations on the vehicle having respective predetermined distances with respect to each other, the magnetic anomaly INS-aiding system being configured to generate the magnetic anomaly data based on magnetic field measurements of a fixed magnetic anomaly at each of the plurality of magnetometers with respect to the predetermined distances; and
a magnetometer controller configured to implement a correlation algorithm based on the magnetic field measurements, the correlation algorithm being configured to provide feature matching on each of the magnetic field measurements to substantially suppress noise associated with the magnetic field measurements and provide error correction with respect to detection of the fixed magnetic anomaly, wherein the magnetometer controller is further configured to generate a confidence score associated with the detection of the fixed magnetic anomaly based on the correlation algorithm, and wherein the magnetometer controller implements the confidence score and the magnetic field measurements in real-time to calculate the velocity of the vehicle relative to an Earth coordinate frame.

13. The system of claim 12, wherein the plurality of magnetometers comprises a first magnetometer located at a fore-section of the vehicle and a second magnetometer located at an aft-section of the vehicle, the first and second magnetometers being located a predetermined distance with respect to each other along a substantially central axis of the vehicle corresponding to a direction of forward vehicle motion.

14. The system of claim 12, wherein the at least one navigation sensor configured on the vehicle comprises at least one of a gyroscope and an accelerometer, wherein the navigation controller is configured to substantially mitigate errors associated with the at least one of the gyroscope and the accelerometer based on the magnetic anomaly data.

* * * * *